(12) United States Patent
Pontier et al.

(10) Patent No.: US 8,370,331 B2
(45) Date of Patent: Feb. 5, 2013

(54) DYNAMIC VISUALIZATION OF SEARCH RESULTS ON A GRAPHICAL USER INTERFACE

(75) Inventors: Laurent Pontier, Bailly (FR); Louay Gargoum, Killiney (IE)

(73) Assignee: Business Objects Software Limited, Dublin (IE)

( * ) Notice: Subject to any disclaimer, the term of this patent is extended or adjusted under 35 U.S.C. 154(b) by 236 days.

(21) Appl. No.: 12/829,421

(22) Filed: Jul. 2, 2010

(65) Prior Publication Data
US 2012/0005198 A1 Jan. 5, 2012

(51) Int. Cl.
*G06F 7/00* (2006.01)
(52) U.S. Cl. ........ 707/722; 707/723; 707/731; 707/752; 707/756
(58) Field of Classification Search .................. None
See application file for complete search history.

(56) References Cited

U.S. PATENT DOCUMENTS

| | | | | |
|---|---|---|---|---|
| 5,515,488 | A * | 5/1996 | Hoppe et al. | 345/440 |
| 7,623,129 | B2 | 11/2009 | Sagalov | |
| 2009/0144262 | A1* | 6/2009 | White et al. | 707/5 |
| 2010/0010986 | A1* | 1/2010 | Icho et al. | 707/5 |
| 2010/0082634 | A1* | 4/2010 | Leban | 707/741 |

OTHER PUBLICATIONS

Lars Langer, Erik Frokjaer; Improving Web Search Transparency by Using a Venn Diagram Interface; Proceedings of the 5th Nordic conference on Human-computer interaction: building bridges—Lund, Sweden; 2008; ACM New York, NY, USA (http://portal.acm.org/citation.cfm?id=1463187).

Ronald Fagin, Yoelle S. Maarek; Allowing users to weight search terms; Proceedings of RIAO (Recherche d'Informations Assistee par Ordinateur = Computer-Assisted Information Retrieval)—pp. 682-700; Paris, France; 2000 (http://citeseerx.ist.psu.edu/viewdoc/download?doi=10.1.1.25.9920&rep=rep1&type=pdf).

Anselm Spoerri; InfoCrystal: a visual tool for information retrieval & management; Proceedings of the second international conference on Information and knowledge management—Washington D.C., USA; 1993; ACM New York, NY, USA (http://portal.acm.org/citation.cmf?id=170088.170095&coll=ACM&dl=ACM&CFID=95480735&CFTOKEN=23018176).

* cited by examiner

*Primary Examiner* — Debbie Le
*Assistant Examiner* — Anh Tai Tran

(57) ABSTRACT

Various embodiments of systems and methods for dynamic visualization of search results on a GUI are described herein. A search query received by a user is divided into a plurality of search parts. One or more search results for each of the plurality of search parts are retrieved. Further, a search result array is generated from the retrieved search results. Furthermore, Venn diagram graphical representation of the search results in the search result array is determined and the same is displayed on the GUI. The Venn diagram graphical representation defines display of search results in the Venn diagram and the relevancy ranking of the search results. In addition, the user can specify a weighting for each of the plurality of search parts, which dynamically determines display opacity of at least one of the associated search results and search part circles of the Venn diagram on the GUI.

17 Claims, 6 Drawing Sheets

DYNAMIC VISUALIZATION OF SEARCH RESULTS ON A GRAPHICAL USER INTERFACE

FIELD

Embodiments generally relate to computer systems, and more particularly to methods and systems for providing a graphical user interface (GUI) for dynamic visualization of search results.

BACKGROUND

Generally, when a user provides a search request to a search engine for retrieving relevant information, the search engine returns an ordered list of search results. Currently, each individual listing of the search results is represented by a fragment of text containing keywords as found. Also, the listing may include a hyperlink to the search result, allowing the user to locate the source or the location of the search result such as a web page.

However, the number of search results in the listing can be overwhelming and it may be difficult for the user to select the desired search result. Also, it may be a time consuming process to select each listed search result and to determine their relevancy. Often the search engine may list duplicates of the search result if the web page contains the search keyword at different locations. Further, the search results can be filtered by conducting a new search for refined search query, which also consumes time.

In particular, the present practice of visual representation of search results on a GUI in a list of fragments of text containing the search keyword is inefficient. Also, it may not simplify the task of selecting desired search results or help in filtering the search results. Therefore, clarity and precision in displaying search results on the GUI while also making it easier for the user to select the desired search result would be desirable.

SUMMARY

Various embodiments of systems and methods for dynamic visualization of search results on a GUI are described herein. A search query received by a user is divided into a plurality of search parts. One or more search results for each of the plurality of search parts are retrieved from a search engine based on a relevancy ranking of the search results. Further, a search result array is generated from the retrieved search results by removing duplicates of the retrieved search results. Furthermore, a Venn diagram graphical representation of the search results in the search result array is determined and the same is displayed on the GUI. The Venn diagram graphical representation defines display of the search results in the search result array and the relevancy ranking of the search results. In addition, the user may specify a weighting for each of the plurality of search parts, which dynamically determines display opacity of the associated search results on the GUI.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for methods and systems for dynamic visualization of search results on a GUI are described herein. The search results may be relevant documents, web pages and the like retrieved from a search engine for a search query. The search query refers to the information provided or inputted to the search engine to define the subject matter that a user is interested in searching. The user refers to an agent, a human, a computer or other mechanism capable of providing the search query and of receiving the search results. The search results are graphically represented on the GUI using a Venn diagram. The term circle or portion, when used in conjunction with the Venn diagram, includes any closed plane figure for identifying a category in the Venn diagram (e.g., ellipse, polygon, irregular shape, and the like).

A complex search query is exploded into simpler search parts and the relevant search results are retrieved from a search engine. The search results are presented to the user in an intuitive and meaningful way on the GUI using the Venn diagram as per relevancy ranking of the search results, association of search results with the search parts and the like. Also, the display of duplicates of the search results is excluded. In addition, the user can specify his/her relative interest in one or more search parts on the GUI, and in response, the display opacity of at least one of the associated search results and associated search part circles are changed dynamically. Therefore, the visual representation of the search results on the GUI grasps a great deal of information at one time which makes it easier for the user to select the desired search result.

In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
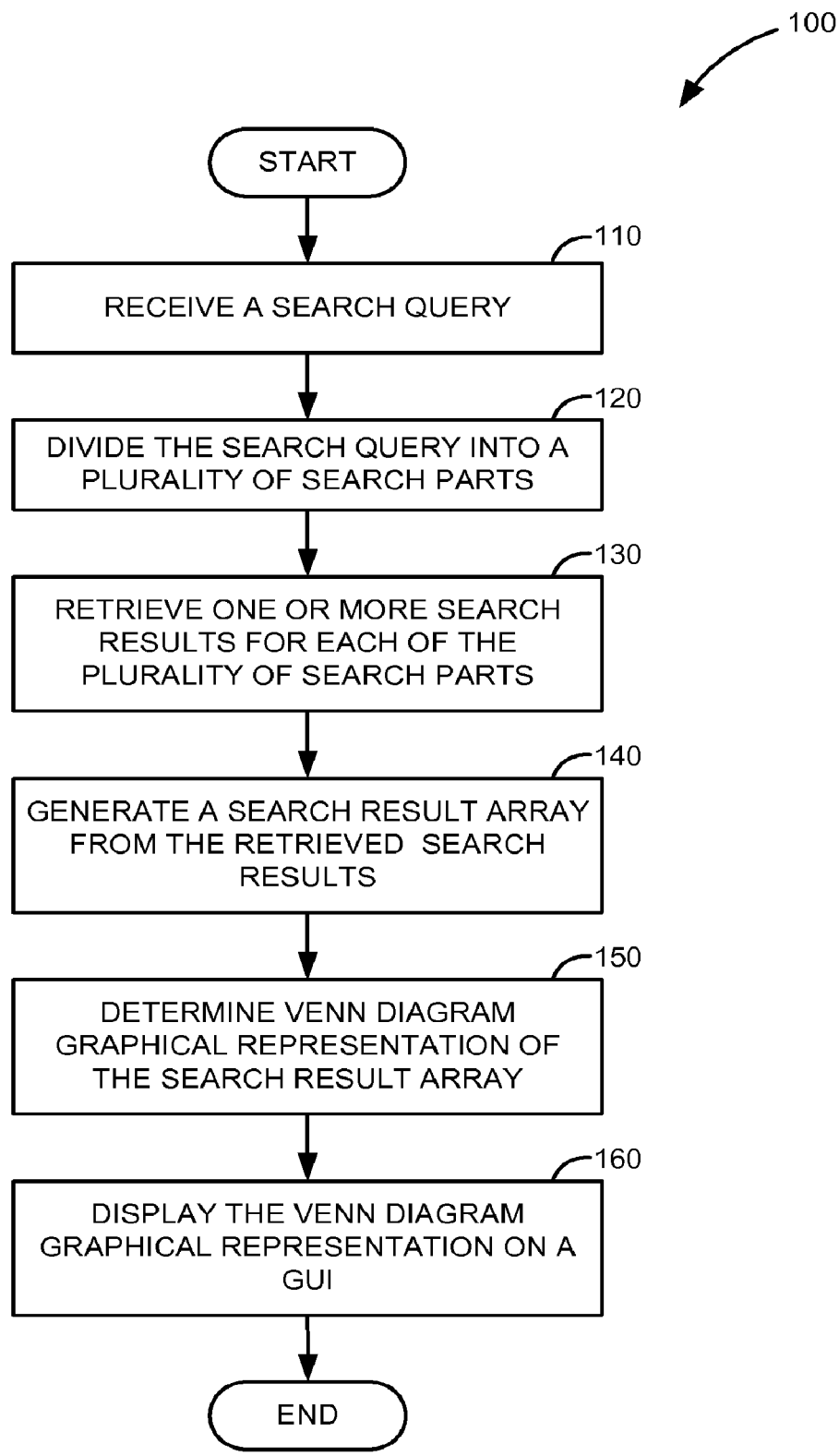
FIG. 1 is a flow diagram illustrating a process for dynamic visualization of search results on a GUI, according to an embodiment.

FIG. 1 is a flow diagram illustrating a process 100 for dynamic visualization of search results on a GUI, according to an embodiment. At step 110, a search query initiated by a user is received. At step 120, the received search query is divided into a plurality of search parts. In one exemplary embodiment, ordinary or small words such as 'an', 'the' and the like are removed from the search query through small words removal process, if the search query is a sentence. Further, space between the words of the search query is used to divide the search query into the plurality of search parts. In another exemplary embodiment, the search query is divided based on the parenthesis. In other words, a corresponding closed parenthesis ')' is searched for each open parenthesis '(' that is encountered and the search query is divided into the plurality of search parts based on the parenthesis. Search parts are the keywords used to retrieve the search results from a search engine. The search engine consults a database and determines which sources, such as web pages, documents and the like, correspond to the search keywords. At step 130, the search engine retrieves one or more search results for each of the plurality of search parts based on a relevancy ranking of the search results.

At step 140, a search result array is generated from the retrieved search results. The retrieved search results may include duplicates of one or more search results as the search result may be retrieved for the plurality of search parts. The process of generating the search result array includes removing one or more duplicate search results from the retrieved search results. In other words, the duplicates of the search results as retrieved from the search engine are excluded.

At step 150, a Venn diagram graphical representation of the search results in the search result array is determined. In one embodiment, the Venn diagram graphical representation defines display of the search results in the search result array in a Venn diagram and size of icons and/or text representing the search results in the search result array as per the relevancy ranking of the search results.

In an embodiment, displaying the search results in the search result array in the Venn diagram includes displaying some of the search results in the search result array in a non-overlapped portion of a corresponding search part in the Venn diagram, and displaying the remaining search results in the search result array in an overlapped portion of a corresponding plurality of search parts in the Venn diagram through vector addition.

In an embodiment, relevancy ranking of the search results in the search result array determines the size of the icons and/or text representing the search results in the Venn diagram. The size of some of the icons and/or text representing the search results in the search result array associated with a plurality of the search parts is computed as an average of individual relevancy rankings of individual search results as retrieved for the corresponding plurality of search parts.

At step 160, the Venn diagram is displayed on the GUI based on the determination of the Venn diagram graphical representation of the search results in the search result array as described in step 150.

In one embodiment, a weighting of user interest in each of the plurality of search parts can be specified by the user on the GUI, and the specification is applied to the display opacity of at least one of the associated search results and associated search part circles on the GUI. The display opacity of some of the search results in the search result array associated with the plurality of the search parts is computed as an average of the weightings of the associated plurality of search parts.

Figure 2:
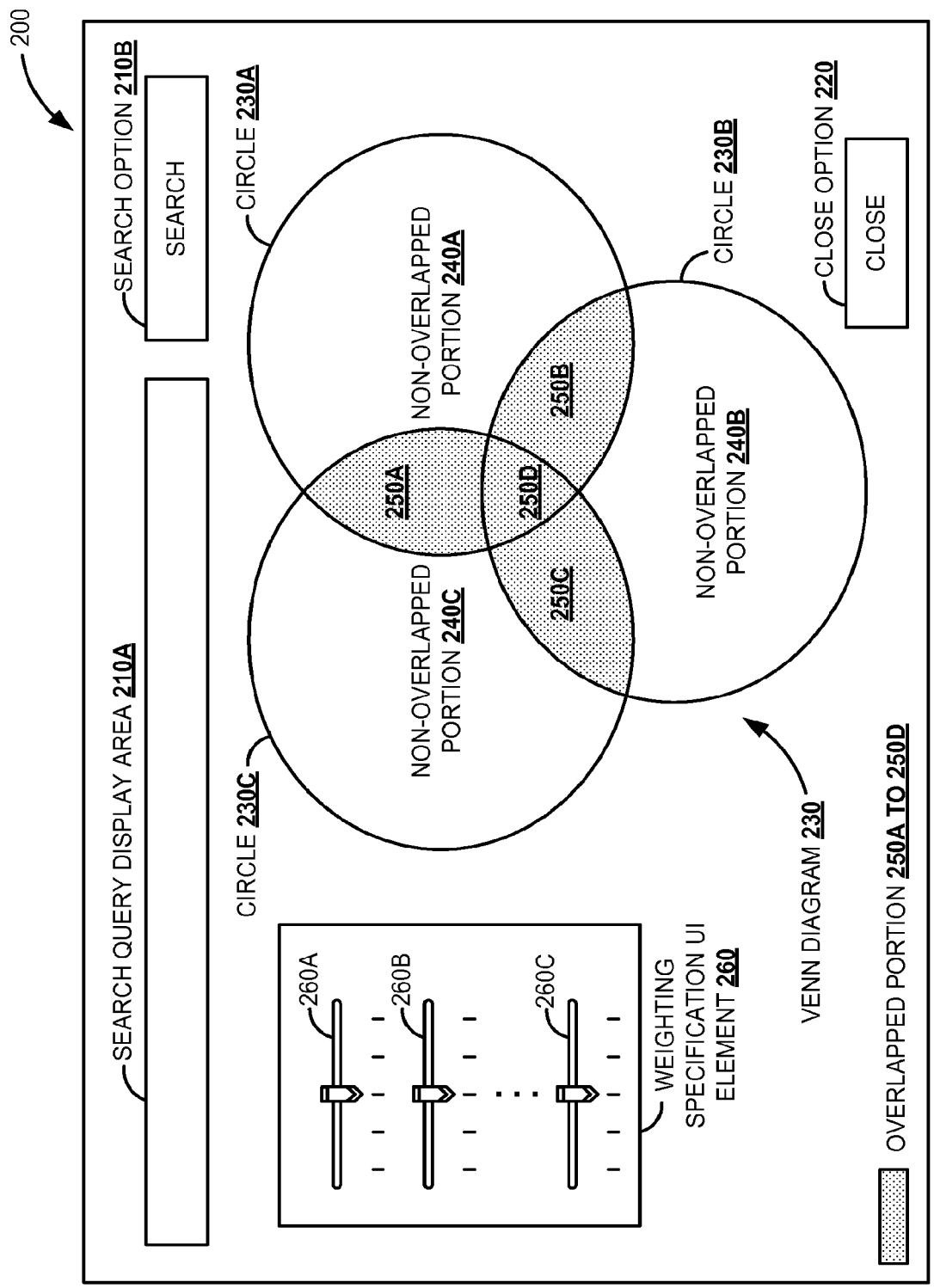
FIG. 2 is a schematic diagram illustrating a GUI for dynamic visualization of search results, according to an embodiment.

FIG. 2 is a schematic diagram illustrating a GUI 200 for dynamic visualization of search results, according to an embodiment. In operation, the GUI 200 is configured to receive a search query initiated by a user (as illustrated in step 110 of FIG. 1) and display search results in a search result array associated with the search query using a Venn diagram (as illustrated in step 160 of FIG. 1). In one embodiment, the GUI 200 includes one or more input elements and the Venn diagram 230. The one or more input elements include a search query display area 210A configured to receive the search query from the user through a 'search' option 210B, a 'close' option 220 configured to allow the user to close the application and a weighting specification user interface (UI) element 260.

In one embodiment, the Venn diagram 230 is used to display search results associated with the search query on the GUI 200. The Venn diagram 230 includes a plurality of circles 230A to 230C associated with a plurality of search parts of the search query, a plurality of non-overlapped portions 240A to 240C of the plurality of circles 230A to 230C, and a plurality of overlapped portions or intersection portions 250A to 250D of the plurality of circles 230A to 230C. In one embodiment, each non-overlapped portion 240A to 240C displays one or more search results in the search result array associated with a search part. Each overlapped portion 250A to 250D displays one or more search results in the search result array associated with a plurality of search parts.

In one embodiment, a weighting, indicative of a user's relative interest in the various parts of the plurality of search parts, may be specified by the user through the weighting specification UI element 260 on the GUI 200. The weighting specification UI element 260 includes a plurality of weighting specification UI elements 260A to 260C associated with each of the plurality of search parts. The weighting of the plurality of search parts defines display opacity of at least one of the associated search results and associated search part circles on the GUI 200 dynamically. Further, the GUI is operable to display the search results in the search result array as per relevancy ranking of the search results, wherein the relevancy ranking of the search results determines size of the determines the size of icons and/or text representing the search results.

Figure 3:
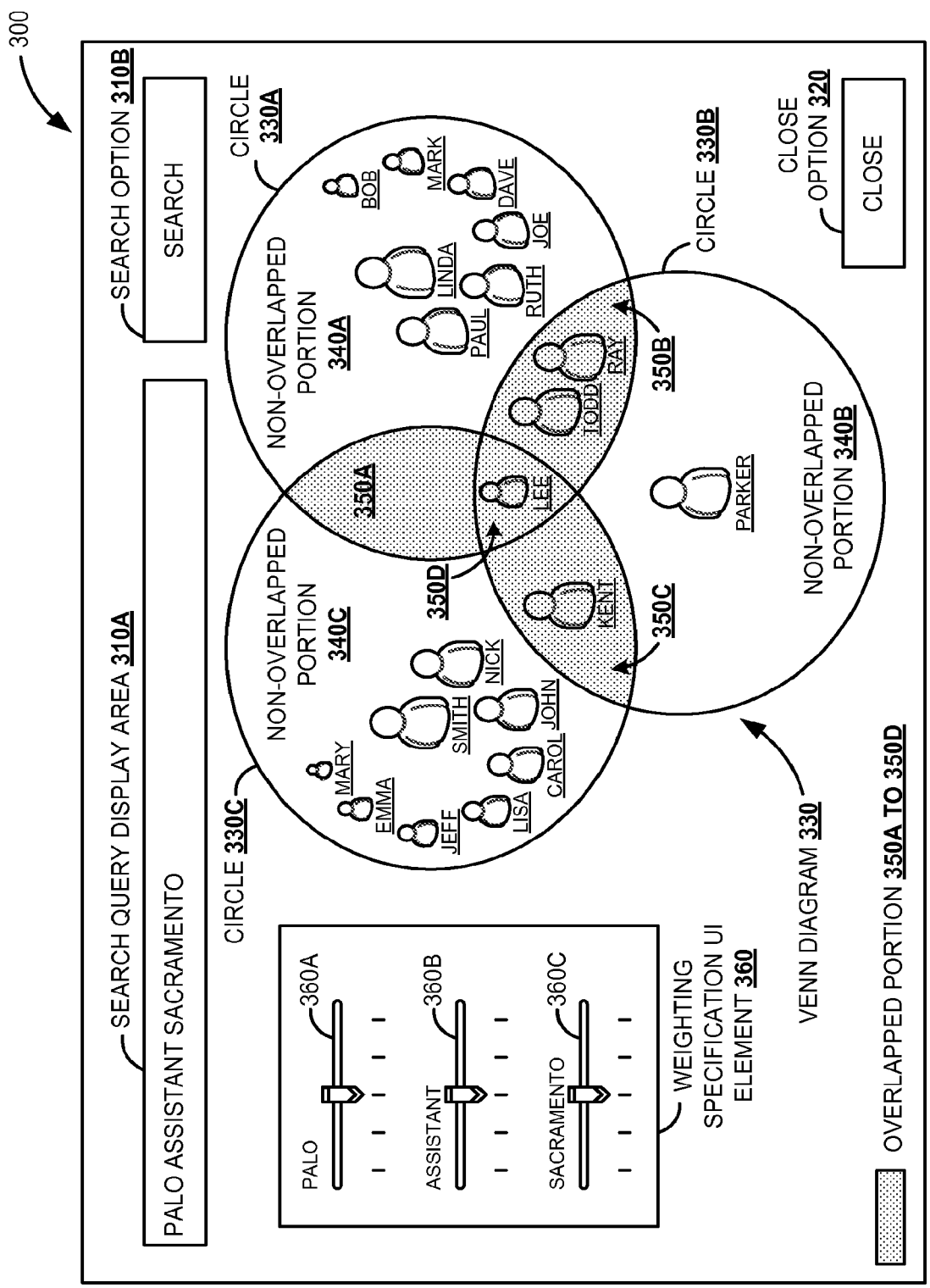
FIG. 3 is a schematic diagram of an exemplary GUI displaying search results, according to an embodiment.

FIG. 3 is a schematic diagram of an exemplary GUI 300 displaying search results, according to an embodiment. In an exemplary embodiment, a search query 'PALO ASSISTANT SACRAMENTO' is initiated by a user in a search query display area 310A and the search query is submitted by clicking a search option 310B. Further, the received search query 'PALO ASSISTANT SACRAMENTO' is divided into a plurality of search parts such as 'PALO', 'ASSISTANT' and 'SACRAMENTO', which are sent to a search engine. The search engine retrieves one or more search results for each of the plurality of search parts based on a relevancy ranking of the one or more search results. For example, the search results 'LINDA', 'PAUL', 'TODD', 'RAY', 'RUTH', 'JOE', 'LEE', 'DAVE', 'MARK' and 'BOB' are retrieved for the search part 'PALO'. The search results 'PARKER', 'KENT', 'TODD', 'RAY' and 'LEE' are retrieved for the search part 'ASSISTANT'. The search results 'SMITH', 'NICK', 'JOHN', 'KENT', 'CAROL', 'LEE', 'LISA', 'JEFF', 'EMMA' and 'MARY' are retrieved for the search part 'SACRAMENTO'.

In one embodiment, a search result array is generated from the retrieved search results, wherein one or more duplicate search results from the retrieved search results are removed. For example, the search results 'TODD' and 'RAY' are retrieved for the search parts 'PALO' and 'ASSISTANT'. The search result 'KENT' is retrieved for the search parts 'ASSISTANT' and 'SACRAMENTO'. Similarly, the search result 'LEE' is retrieved for all the search parts 'PALO', 'ASSISTANT' and 'SACRMENTO'. Therefore, the retrieved one or more search results includes duplicates of the search results 'TODD', 'RAY', 'KENT' and 'LEE' and hence the duplicates of these search results are removed. In other words, the search result array does not include duplicates of search results.

In one embodiment, the search results in the search result array are displayed in a Venn diagram 330. The Venn diagram 330 includes a plurality of circles 330A to 330C associated with a plurality of search parts. For example, a circle 330A is associated with the search part 'PALO', a circle 330B is associated with the search part 'ASSISTANT' and a circle 330C is associated with the search part 'SACRAMENTO'.

Further, a plurality of non-overlapped portions 340A to 340C of the plurality of circles 330A to 330C displays some of the search results in the search result array associated with a search part. For example, the search results 'LINDA', 'PAUL', 'RUTH', 'JOE', 'DAVE', 'MARK' and 'BOB' are displayed in a non-overlapped portion 340A of the circle 330A, which is associated with the search part 'PALO'. The search result 'PARKER' is displayed in a non-overlapped portion 340B of the circle 330B, which is associated with the search part 'ASSISTANT'. The search results 'SMITH', 'NICK', 'JOHN', 'CAROL', 'LISA', 'JEFF', 'EMMA' and 'MARY' are displayed in a non-overlapped portion 340C of the circle 330C, which is associated with the search part 'SACRAMENTO'.

Furthermore, a plurality of overlapped portions 350A to 350D displays remaining search results in the search result array associated with a plurality of the search parts. For example, the search results 'TODD' and 'RAY' which are retrieved for the search parts 'PALO' and 'ASSISTANT' are displayed in an associated overlapped portion 350B. The search result 'KENT' which is retrieved for the search parts 'ASSISTANT' and 'SACRAMENTO' is displayed in an associated overlapped portion 350C. Since there are no common search results retrieved for the search parts 'PALO' and 'SACRAMENTO', overlapped portion 350A is empty. The search result 'LEE' is retrieved for all three search parts 'PALO', 'ASSISTANT' and 'SACRAMENTO', and hence 'LEE' is displayed in an overlapped portion 350D, which is associated with the search parts 'PALO', 'ASSISTANT' and 'SACRAMENTO'. The display of the search results in the search result array in the Venn diagram is described in greater detail in FIG. 4.

In one embodiment, the user may specify a weighting of the plurality of search parts through a weighting specification UI element 360 on the GUI 300. The weighting specification UI element 360 includes a plurality of weighting specification UI elements 360A to 360C with respect to the plurality of search parts. The user can specify weightings of search parts 'PALO' 'ASSISTANT' and 'SACRAMENTO' through the weighting specification UI elements 360A to 360C respectively. The determination of the display opacity of at least one of the search results and associated search part circles on the GUI 300 according to the weighting of the plurality of search parts is described in greater detail in FIG. 5.

In an embodiment, the Venn diagram graphical representation defines the relevancy ranking of the search results in the search result array. The relevancy ranking of the search results in the search result array determines size of icons and/or text representing the search results on the Venn diagram 330. The size of the icons and/or text representing the search results is the composition of the relevancy ranking of the search results. For example, the size of the search result 'LINDA' is larger than the search result 'PAUL' as the relevancy ranking of 'LINDA' is greater than 'PAUL'. Similarly, the size of the icons and/or text representing the search results in the search result array associated with a search part can be determined. Further, the size of the icons and/or text representing the search results associated with the plurality of search parts is computed as an average of the relevancy ranking of the individual search results retrieved from the associated plurality of search parts. For example, the size of the icons and/or text representing the search results 'TODD' and 'RAY' is the average of the relevancy ranking as obtained for the search parts 'PALO' and 'ASSISTANT'. Similarly, the size of the icons and/or text representing the search results 'KENT' and 'LEE' which are associated with the plurality of search parts is computed. In addition, a close option 320 is provided to close the application.

Figure 4:
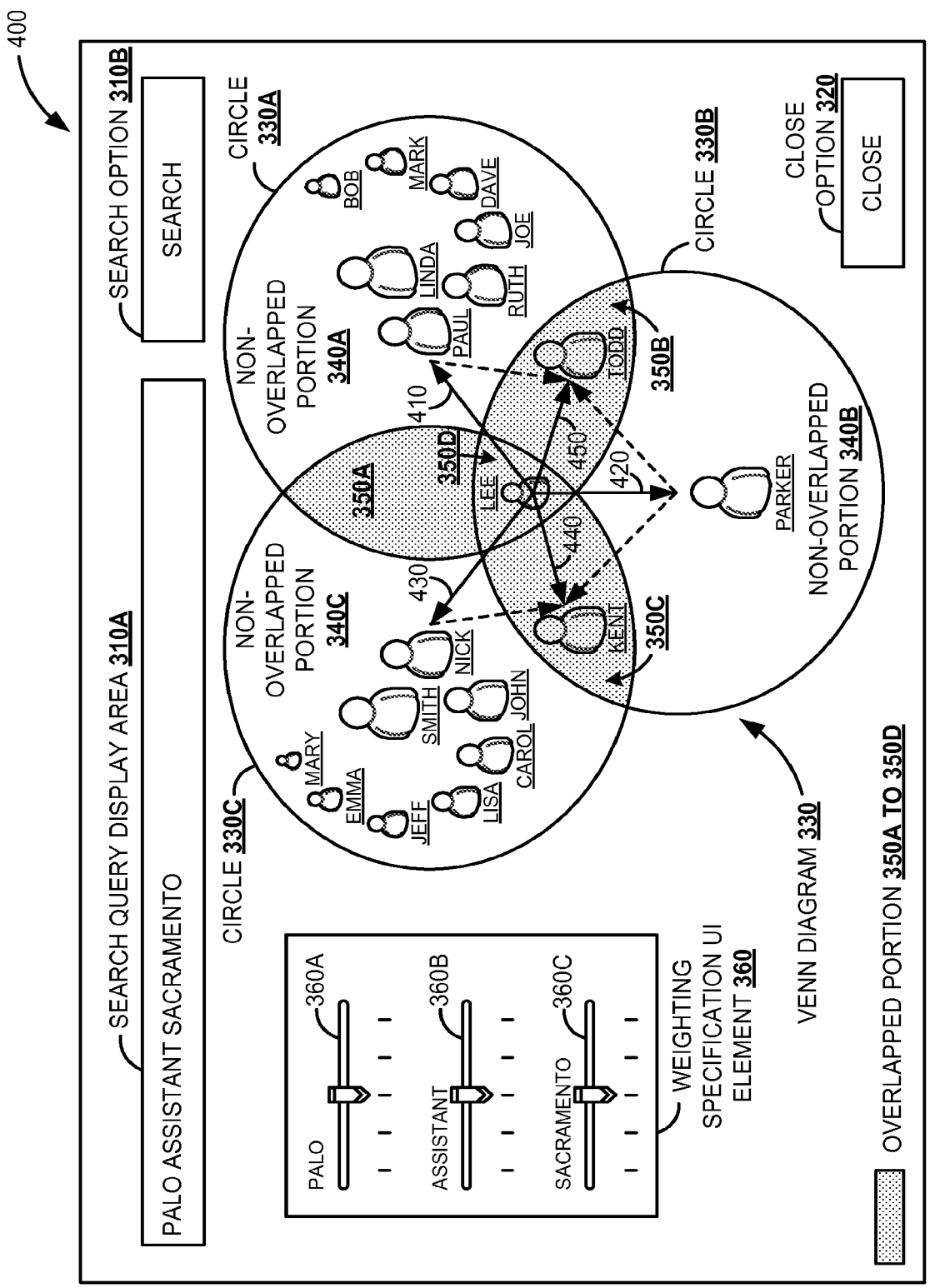
FIG. 4 is a schematic diagram of the exemplary GUI illustrating display of a search result array in a Venn diagram, according to an embodiment.

FIG. 4 is a schematic diagram of the exemplary GUI 400 illustrating display of a search result array in the Venn diagram 330, according to an embodiment. In one embodiment, some of the search results in the search result array associated with a search part are displayed in the non-overlapped portion of the associated search part in the Venn diagram 330 in an ordered way such as in a spiral, circle, line or the like. For example, the search results 'LINDA', 'PAUL', 'RUTH', 'JOE', 'LEE', 'DAVE', 'MARK' and 'BOB' are displayed as a spiral in the non-overlapped portion 340A of the search part 'PALO'. Similarly, the search results associated with the search parts 'ASSISTANT' and 'SACRAMENTO' are displayed in non-overlapped portions 340B and 340C respectively.

In an exemplary embodiment, the remaining search results in the search result array associated with a plurality of search parts are displayed through a composition of the vectors of the search parts in an overlapped portion of associated search parts in the Venn diagram 330. Vector V1 410 is the distance from the center of the Venn diagram 330 to the center of the circle 330A associated with the search part 'PALO'. Vector V2 420 is the distance from the center of the Venn diagram 330 to the center of the circle 330B associated with the search part 'ASSISTANT'. Vector V3 430 is the distance from the center of the Venn diagram 330 to the center of the circle 330C associated with the search part 'SACRAMENTO'. The search results 'TODD' and 'RAY' associated with the search parts 'PALO' and 'ASSISTANT' are displayed at a resultant 450 of the vectors V1 410 and the V2 420. Since vector resultant for both the search results 'TODD' and 'RAY' are at the same point, the search results 'TODD' and 'RAY' are displayed around the vector resultant and within the associated overlapped portion 350B. Similarly, the search result 'KENT' is displayed at a resultant 440 of the vectors V2 420 and V3 430.

Figure 5:
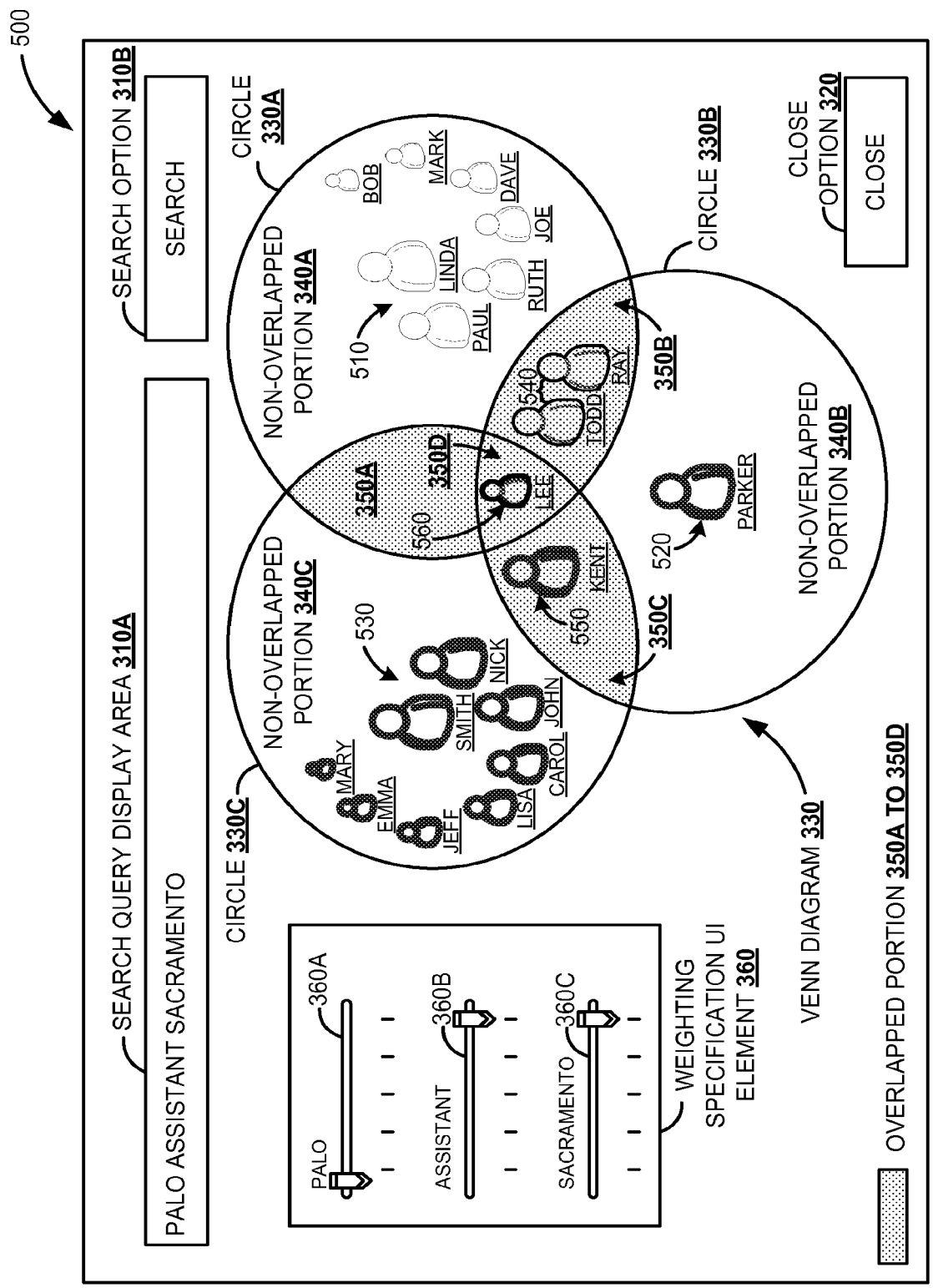
FIG. 5 is a schematic diagram of the exemplary GUI illustrating dynamic reflection of weightings of the plurality of search parts on associated search results, according to an embodiment.

FIG. 5 is a schematic diagram of the exemplary GUI 500 illustrating dynamic reflection of weightings of the plurality of search parts on the associated search results, according to an embodiment. In one embodiment, the user can specify a weighting of the plurality of search parts through the weighting specification UI element 360 on the GUI 500. The weighting of the plurality of search parts defines display opacity of the search results in the search result array on the GUI 500 and can be changed dynamically. The display opacity is the composition of the user provided percentage of interest in the search parts. For example, the weightings of the search parts 'ASSISTANT' and 'SACRAMENTO' are set to 100%, while the weighting of the search part 'PALO' is set to 10% through the plurality of weighting specification UI elements 360A to 360C. Consequently, the display opacity of the associated search results is dynamically set to 100% for the search parts 'ASSISTANT' and 'SACRAMENTO' and to 10% for the search part 'PALO', as illustrated by references 510 to 530. In another embodiment, the display opacity of the circles associated with the search parts 330A to 330C along with the display opacity of the search results are defined by the weightings of the search parts.

In one embodiment, the display opacity of the search results on the GUI is computed as an average of the weightings of the associated plurality of search parts. For example, the display opacity of search results 'TODD' and 'RAY', which are associated with the search parts 'PALO' and 'ASSISTANT' is dynamically set to 55%, i.e., the average of the weightings of 'PALO' and 'ASSISTANT', as illustrated by reference 540. Similarly, references 550 and 560 illustrate display opacity of search results 'KENT' and 'LEE' respectively.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 6:
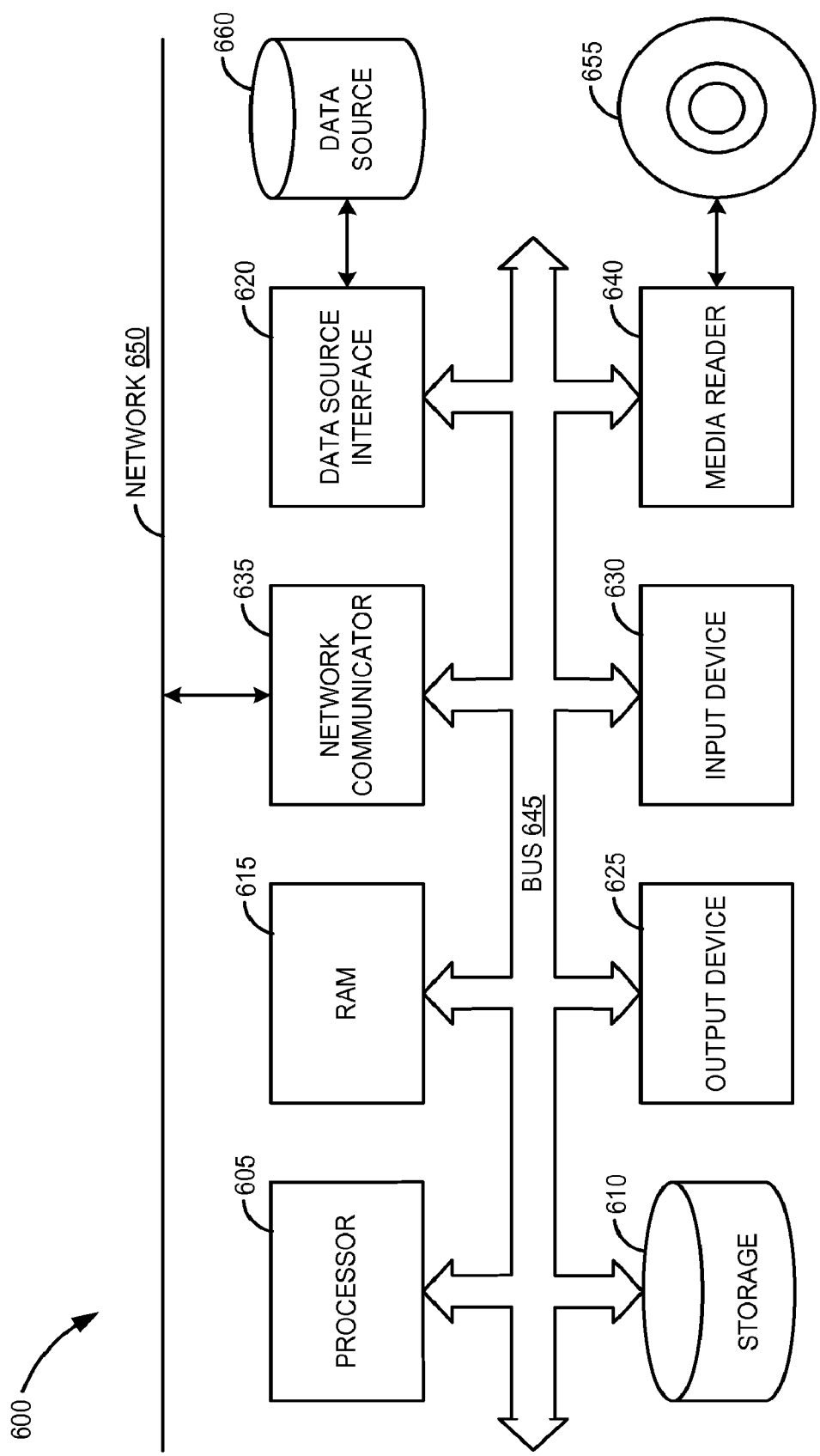
FIG. 6 is a block diagram illustrating a computing environment in which the techniques described for dynamic visualization of search results on a GUI can be implemented, according to an embodiment.

FIG. 6 is a block diagram of an exemplary computer system 600. The computer system 600 includes a processor 605 that executes software instructions or code stored on a computer readable storage medium 655 to perform the above-illustrated methods of the invention. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment of the invention, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in detail to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to tangibly store instructions, which when executed by a computer, cause the computer to:
   receive a search query;
   divide the search query into a plurality of search parts;
   retrieve one or more search results for each of the plurality of search parts based on a relevancy ranking of the one or more search results;
   generate a search result array from the retrieved one or more search results;
   determine a Venn diagram graphical representation of the search result array; and
   display the Venn diagram graphical representation on a graphical user interface (GUI), comprising:
      displaying the one or more search results in the search result array within a Venn diagram, comprising:
         displaying some of the one or more search results in the search result array in corresponding non-overlapped portions of the Venn diagram; and
         displaying remaining search results in the search result array in corresponding overlapped portions of the Venn diagram through vector addition.

2. The article of manufacture of claim 1, wherein generating the search result array comprises removing one or more duplicate search results from the retrieved one or more search results.

3. The article of manufacture of claim 1, wherein the relevancy ranking of the one or more search results in the search result array determines size of icons and text representing the one or more search results as displayed in the Venn diagram.

4. The article of manufacture of claim 3, wherein the size of some of the icons and text representing the one or more search results in the search result array associated with the plurality of search parts is computed as an average of individual relevancy ranking of individual search results of the plurality of search parts.

5. The article of manufacture of claim 1, wherein the computer readable storage medium tangibly stores further instructions, which when executed by the computer cause the computer to:
   receive user specified weightings for the plurality of search parts on the GUI; and
   apply the user specified weightings to determine display opacity of at least one of the one or more search results and associated search part circles of the Venn diagram on the GUI.

6. The article of manufacture of claim 5, wherein the display opacity of some of the one or more search results in the search result array associated with the plurality of search parts is computed as an average of the weightings of the associated plurality of search parts.

7. A computerized method for providing dynamic visualization of search results on a graphical user interface (GUI), the method comprising:
   receiving a search query;
   dividing the search query into a plurality of search parts;
   retrieving one or more search results for each of the plurality of search parts based on a relevancy ranking of the one or more search results;
   generating a search result array from the retrieved one or more search results;
   determining a Venn diagram graphical representation of the search result array; and
   displaying the Venn diagram graphical representation on the GUI, comprising:
      displaying the one or more search results in the search result array within a Venn diagram, comprising:
         displaying some of the one or more search results in the search result array in corresponding non-overlapped portions of the Venn diagram; and
         displaying remaining search results in the search result array in corresponding overlapped portions of the Venn diagram through vector addition.

8. The computerized method of claim 7, wherein generating the search result array comprises removing one or more duplicate search results from the retrieved one or more search results.

9. The computerized method of claim 7, wherein the relevancy ranking of the one or more search results in the search result array determines a size of icons and text representing the one or more search results as displayed in the Venn diagram.

10. The computerized method of claim 9, wherein the size of some of the icons and text representing the one or more search results in the search result array associated with the plurality of search parts is computed as an average of individual relevancy ranking of individual search results of the plurality of search parts.

11. The computerized method of claim 7, further comprising:
   receiving user specified weightings for each of the plurality of search parts on the GUI; and
   applying the weighting specification to determine display opacity of at least one of the one or more search results and associated search part circles of the Venn diagram on the GUI.

12. The computerized method of claim 11, wherein the display opacity of some of the one or more search results in the search result array associated with the plurality of search parts is computed as an average of the weightings of the associated plurality of search parts.

13. A computer system comprising a processor, the processor communicating with one or more memory devices storing instructions, the instructions operable to:
   receive a search query;
   divide the search query into a plurality of search parts;

retrieve one or more search results for each of the plurality of search parts based on a relevancy ranking of the one or more search results;

generate a search result array from the retrieved one or more search results;

determine a Venn diagram graphical representation of the search result array; and display the Venn diagram graphical representation on a graphical user interface (GUI), comprising:

displaying the one or more search results in the search result array within a Venn diagram, comprising:

displaying some of the one or more search results in the search result array in corresponding non-overlapped portions of the Venn diagram; and displaying remaining search results in the search result array in corresponding overlapped portions of the Venn diagram through vector addition.

14. The computer system of claim 13, wherein the GUI comprises a search query display area to receive the search query.

15. The computer system of claim 13, wherein the GUI is further operable to display the one or more search results in the search result array as per relevancy ranking of the one or more search results, which determines size of icons and text representing the one or more search results.

16. The computer system of claim 13, wherein the GUI is further operable to provide a weighting specification UI element for a user to specify weightings of the plurality of search parts, which define display opacity of at least one of the one or more search results and associated search part circles of the Venn diagram on the GUI.

17. The computer system of claim 13, wherein the Venn diagram comprises:

a plurality of circles corresponding to the plurality of search parts of the search query;

a plurality of overlapped portions of the plurality of circles, wherein each overlapped portion displays the some of the one or more search results in the search result array associated with the plurality of search parts; and a plurality of non-overlapped portions of the plurality of circles, wherein each non-overlapped portion displays the remaining one or more search results in the search result array associated with a single search part of the plurality of search parts.

\* \* \* \* \*